(12) United States Patent
Li

(10) Patent No.: US 12,134,088 B2
(45) Date of Patent: Nov. 5, 2024

(54) CATALYTIC COMPOSITION WITH ADDED COPPER TRAPPING COMPONENT FOR NOx ABATEMENT

(71) Applicant: BASF MOBILE EMISSIONS CATALYSTS LLC, Iselin, NJ (US)

(72) Inventor: Yuejin Li, Iselin, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 501 days.

(21) Appl. No.: 17/309,117

(22) PCT Filed: Oct. 24, 2019

(86) PCT No.: PCT/US2019/057806
§ 371 (c)(1),
(2) Date: Apr. 27, 2021

(87) PCT Pub. No.: WO2020/092113
PCT Pub. Date: May 7, 2020

(65) Prior Publication Data
US 2022/0001371 A1    Jan. 6, 2022

Related U.S. Application Data

(60) Provisional application No. 62/846,050, filed on May 10, 2019, provisional application No. 62/753,188, filed on Oct. 31, 2018.

(51) Int. Cl.
*B01J 35/56* (2024.01)
*B01J 21/04* (2006.01)
(Continued)

(52) U.S. Cl.
CPC ............... *B01J 35/56* (2024.01); *B01J 21/04* (2013.01); *B01J 29/723* (2013.01); *B01J 35/40* (2024.01);
(Continued)

(58) Field of Classification Search
CPC ............... F01N 3/2073; F01N 2370/00; F01N 2572/14; B01D 53/8628; B01D 53/8631;
(Continued)

(56) References Cited

U.S. PATENT DOCUMENTS 5,354,720 A   10/1994  Leyrer et al.
8,535,629 B2   9/2013  Ballinger et al.
(Continued)

FOREIGN PATENT DOCUMENTS

DE   202008018318 U1   11/2012
JP   2013-522011 A    6/2013
(Continued)

OTHER PUBLICATIONS

Park et al., "Analysis of SCR performance differences caused from flow characteristics ow wall flow and flow through type substrate : A simulation study", Chemical Engineering Science, 88, (2013), pp. 69-78.*

(Continued)

*Primary Examiner* — Colin W. Slifka
(74) *Attorney, Agent, or Firm* — DLA Piper LLP (US)

(57) ABSTRACT

The present disclosure provides catalyst compositions for $NO_x$ conversion and wall-flow filter substrates comprising such catalyst compositions. Certain catalyst compositions include a zeolite with sufficient Cu exchanged into cation sites thereof to give a Cu/Al ratio of 0.1 to 0.5 and a CuO loading of 1 to 15 wt. %; and a copper trapping component (e.g., alumina) including a plurality of particles having a $D_{90}$ particle size of about 0.5 to 20 microns in a concentration of about 1 to 20 wt. %. The zeolite and copper trapping component can be in the same washcoat layer or can be in different washcoat layers (such that the copper trapping component serves as a "pre-coating" on the wall-flow filter substrate).

23 Claims, 10 Drawing Sheets

(51) Int. Cl.
*B01J 29/72* (2006.01)
*B01J 35/40* (2024.01)
*B01J 37/00* (2006.01)
*B01J 37/02* (2006.01)
*B01J 37/08* (2006.01)
*F01N 3/20* (2006.01)

(52) U.S. Cl.
CPC ....... *B01J 37/0036* (2013.01); *B01J 37/0244* (2013.01); *B01J 37/0246* (2013.01); *B01J 37/08* (2013.01); *F01N 3/2066* (2013.01); B01J 37/0248 (2013.01); F01N 2330/06 (2013.01); F01N 2330/30 (2013.01); F01N 2370/04 (2013.01); F01N 2510/0684 (2013.01)

(58) Field of Classification Search
CPC ........ B01D 53/9413; B01D 2258/0283; B01D 2255/20761; B01D 2255/50; B01D 2255/9035; B01D 2255/9155; B01D 2255/9207; B01D 2255/902; B01D 2255/9022; B01D 2255/9027; B01D 2255/502; B01D 2255/504; B01J 21/04; B01J 21/066; B01J 23/72; B01J 2229/183; B01J 2229/186; B01J 29/723; B01J 29/072; B01J 29/061; B01J 29/064; B01J 29/076; B01J 29/46; B01J 29/48; B01J 29/72; B01J 29/78; B01J 29/783; B01J 29/763; B01J 29/76; B01J 35/0006; B01J 35/1004; B01J 35/04; B01J 35/023; B01J 35/1019; B01J 35/1023; B01J 37/0244; B01J 37/038; B01J 37/0246; B01J 37/0248
USPC ........ 502/60, 63, 64, 66, 69, 71, 73, 74, 77, 502/78, 79
See application file for complete search history.

(56) References Cited

U.S. PATENT DOCUMENTS

| | | |
|---|---|---|
| 2008/0125316 A1 | 5/2008 | Noda et al. |
| 2012/0184429 A1 | 7/2012 | Andersen et al. |
| 2013/0136662 A1 | 5/2013 | Choi et al. |
| 2014/0044630 A1 | 2/2014 | Swallow et al. |
| 2015/0064074 A1 | 3/2015 | Ballinger et al. |
| 2015/0321184 A1 | 11/2015 | Fedeyko et al. |
| 2016/0008759 A1 | 1/2016 | Sonntag et al. |
| 2017/0362984 A1 | 12/2017 | Li et al. |
| 2018/0021768 A1* | 1/2018 | Chandler ............... B01J 29/068 502/66 |
| 2018/0163596 A1 | 6/2018 | Punke et al. |

FOREIGN PATENT DOCUMENTS

| | | |
|---|---|---|
| JP | 2014-525822 A | 10/2014 |
| JP | 2017-538573 A | 12/2017 |
| JP | 2018-523044 A | 8/2018 |
| WO | 2016/187267 A1 | 11/2016 |
| WO | 2017-134581 A1 | 8/2017 |
| WO | 2018/086977 A1 | 5/2018 |

OTHER PUBLICATIONS

First Examination Report from corresponding Indian Patent Application No. 202127018126 dated Nov. 2, 2022.
Extended European Search Report from correspondence European Patent Application No. 19877987.8 dated Aug. 5, 2022.
First Office Action from corresponding Chinese Patent Appln. No. 201980071978.8 dated Feb. 15, 2023, and a machine generated translation.
Office Action dated Jul. 11, 2023, of counterpart Brazilian Patent Application No. BR 112021008252-2 in English.
Second Office Action dated Aug. 10, 2023, of counterpart Chinese Patent Application No. 201980071978.8, along with an English machine translation.
International Search Report dated Feb. 13, 2020 for International Application No. PCT/US2019/057806.
Rejection Decision dated Jan. 9, 2024, of counterpart Chinese Patent Application No. 201980071978.8, along with an English translation.
Office Action dated Nov. 28, 2023, of counterpart Japanese Patent Application No. 2021-523817, along with an English translation.

* cited by examiner

CATALYTIC COMPOSITION WITH ADDED COPPER TRAPPING COMPONENT FOR NOx ABATEMENT

This application is a U.S. national stage entry application under 35 U.S.C. § 371 from PCT International Application No. PCT/US2019/057806, filed on Oct. 24, 2019, which claims priority to U.S. Provisional Application No. 62/846,050, filed on May 10, 2019, and U.S. Provisional Application No. 62/753,188, filed on Oct. 31, 2018; the contents of each application is incorporated herein by reference in its entirety.

FIELD OF THE INVENTION

The present invention relates to zeolite-containing SCR catalyst compositions with addition of washcoat components capable of trapping mobile copper, methods for the preparation and use of such catalyst compositions for lean emission control applications, and catalyst articles and systems employing such catalyst compositions.

BACKGROUND OF THE INVENTION

Over time, the harmful components of nitrogen oxides ($NO_x$) have led to atmospheric pollution. NO is contained in exhaust gases, such as from internal combustion engines (e.g., in automobiles and trucks), from combustion installations (e.g., power stations heated by natural gas, oil, or coal), and from nitric acid production plants.

Various treatment methods have been used for the treatment of $NO_x$-containing gas mixtures to decrease atmospheric pollution. One type of treatment involves catalytic reduction of nitrogen oxides. There are two processes: (1) a nonselective reduction process wherein carbon monoxide, hydrogen, or a lower molecular weight hydrocarbon is used as a reducing agent; and (2) a selective reduction process wherein ammonia or an ammonia precursor is used as a reducing agent. In the selective reduction process, a high degree of nitrogen oxide removal can be achieved with a small stoichiometric amount of reducing agent.

The selective reduction process is referred to as a SCR (Selective Catalytic Reduction) process. The SCR process uses catalytic reduction of nitrogen oxides with a reductant (e.g., ammonia) in the presence of excess oxygen, resulting in the formation predominantly of nitrogen and steam:

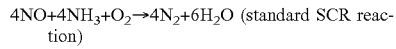
$4NO + 4NH_3 + O_2 \rightarrow 4N_2 + 6H_2O$ (standard SCR reaction)

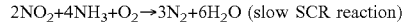
$2NO_2 + 4NH_3 + O_2 \rightarrow 3N_2 + 6H_2O$ (slow SCR reaction)

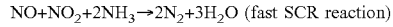
$NO + NO_2 + 2NH_3 \rightarrow 2N_2 + 3H_2O$ (fast SCR reaction)

Catalysts employed in the SCR process ideally should be able to retain good catalytic activity over a wide range of temperature conditions of use, for example, 200° C. to 600° C. or higher, under hydrothermal conditions. SCR catalysts used in exhaust emission control applications are exposed to high temperature hydrothermal conditions during the regeneration of a soot filter, a component of the exhaust gas treatment system used for the removal of particles.

Molecular sieves such as zeolites have been used in the selective catalytic reduction (SCR) of nitrogen oxides with a reductant such as ammonia, urea, or a hydrocarbon in the presence of oxygen. Zeolites are crystalline materials having uniform pore sizes which, depending upon the type of zeolite and the type and amount of cations included in the zeolite lattice, range from about 3 to about 10 Angstroms in diameter. Zeolites having 8-ring pore openings and double-six ring secondary building units, particularly those having cage-like structures, have recently been studied for use as SCR catalysts. A specific type of zeolite having these properties is chabazite (CHA), which is a small pore zeolite with 8 member-ring pore openings (~3.8 Angstroms) accessible through its 3-dimensional porosity. A cage-like structure results from the connection of double six-ring building units by 4 rings.

Metal-promoted zeolite catalysts including, among others, iron-promoted and copper-promoted zeolite catalysts, for the selective catalytic reduction of nitrogen oxides with ammonia are known. For example, iron-promoted zeolite beta has been an effective commercial catalyst for the selective reduction of nitrogen oxides with ammonia, e.g., as described in U.S. Pat. No. 4,961,917. There is always a desire for improved performance of catalysts and, accordingly, it would be beneficial to provide SCR catalysts (and, in particular, SCR catalysts on filter substrates, i.e., SCRoFs) with improved low and/or high temperature performance.

SUMMARY

The present disclosure provides catalyst compositions comprising a copper trapping component (e.g., alumina) and one or more zeolites (e.g., one or more metal-promoted zeolites). The disclosure further provides catalytic articles and systems comprising such catalytic articles, wherein the catalytic articles comprise the referenced catalyst composition disposed on a substrate, e.g., a filter substrate (providing a selective catalytic reduction catalyst on a filter, i.e., an SCRoF). Advantageously, in some such embodiments, catalyst compositions (and associated articles and systems) may exhibit beneficial properties, such as improved $NO_x$ conversion with respect to comparable catalyst compositions without added copper trapping component. Although not intending to be limited by theory, it is believed that the addition of alumina may lead to modification of the microporosity of the resulting catalyst composition. Such microporosities can be described, e.g., by zeolitic surface area (ZSA) of the catalyst composition. The specific microporosity of a given catalyst composition and, in particular, the microporosity of a catalyst composition in calcined and aged form, can affect the activity of that composition. Advantageously, in various embodiments, the disclosed compositions exhibit relatively low SCR activity loss upon aging.

In one aspect, the disclosure provides a catalyst article comprising: a wall-flow filter substrate; and a catalyst composition coated on the wall-flow filter substrate, wherein the catalyst composition comprises: a zeolite with sufficient Cu exchanged into cation sites of the zeolite such that the zeolite has a Cu/Al ratio of 0.1 to 0.5 and a CuO loading of 1 to 15 wt. %; and a copper trapping component in an amount of about 1 to about 20 wt. % based on the weight of the Cu-exchanged zeolite; wherein the copper trapping component comprises a plurality of particles having a $D_{90}$ particle size of about 0.5 to 20 microns.

In some embodiments, the catalyst composition is in the form of a first washcoat comprising the zeolite and a second washcoat comprising the copper trapping component, wherein the second washcoat is disposed directly on at least a portion of the wall-flow filter substrate and the first washcoat is disposed directly on at least a portion of the second washcoat. In some embodiments, the catalyst composition is in the form of a washcoat comprising a physical blend of the zeolite and the copper trapping component, and the washcoat is disposed directly on at least a portion of the wall-flow filter substrate. In further such embodiments, the first washcoat further comprises a second copper trapping component, wherein the second copper trapping component can be the same as or different than the copper trapping component in the second washcoat.

Such catalyst articles may exhibit enhanced activity at low and/or high temperatures. For example, in some embodiments, the disclosed catalyst article exhibits enhanced $NO_x$ conversion at 200° C. as compared with a catalyst composition that does not comprise the copper trapping component. In some embodiments, the disclosed catalyst article exhibits enhanced $NO_x$ conversion at 600° C. as compared with a catalyst composition that does not comprise the copper trapping component.

The makeup and form of the copper trapping component can vary. In some embodiments, comprises a material selected from the group consisting of alumina, silica, zirconia, niobia, molybdenia and combinations thereof. In particular embodiments, the copper trapping component comprises alumina. Such alumina can be selected, for example, from the group consisting of boehmite, gamma-alumina, silica-alumina, stabilized alumina, and combinations thereof. In one particular embodiment, the copper trapping component comprises gamma-alumina. In some embodiments, the copper trapping component comprises a plurality of particles having a $D_{90}$ particle size of about 0.5 to 5 microns. In some embodiments, the copper trapping component comprises a plurality of particles having a $D_{90}$ particle size of about 0.5 to 3 microns.

The composition and form of the zeolite within the disclosed composition can also vary. In some embodiments, the zeolite has an average particle size of about 0.01 to about 5 microns. The zeolite, in various embodiments, can have an "8-ring" framework structure selected from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations and intergrowths thereof. In particular embodiments, the zeolite has a framework structure selected from AEI, AFT, CHA, LTA, and combinations and intergrowths thereof. In one particular embodiment, the zeolite has a CHA framework structure. In other embodiments, the zeolite can have a "10-ring" framework structure selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and combinations and intergrowths thereof. Such framework structures can, for example, be selected from FER, MEL, MFI, STT, and combinations and intergrowths thereof. In further embodiments, the zeolite can have a "12-ring" framework structure selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and combinations and intergrowths thereof. For example, the zeolite in certain embodiments has a framework structure selected from AFI, BEA, FAU, MAZ, MOR, OFF, and combinations and intergrowths thereof.

Compositions comprising zeolites of two or more different framework structures are provided as combinations or intergrowth in certain embodiments, which may have the same ring number or different ring numbers (e.g., comprising two 8-ring framework structures, two 10-ring framework structures, two 12-ring framework structures, an 8-ring and a 10-ring framework structure, an 8-ring and a 12-ring framework structure, or a 10-ring and a 12-ring framework structure). In certain embodiments, the zeolite has a framework structure comprising an intergrowth of CHA and GME or AEI and GME.

The amounts of respective components within the disclosed catalyst composition can, in some embodiments, be provided as follows. In some embodiments, the copper trapping component is present in an amount of about 2 to about 20 wt. % based on the weight of the Cu-exchanged zeolite. In some embodiments, the zeolite within the catalyst composition is present in an amount of about 0.5 g/in$^3$ to about 5.0 g/in$^3$. In further embodiments, the zeolite is present within the catalyst composition in an amount of about 1 g/in$^3$ to about 5.0 g/in$^3$.

In some embodiments, a first portion of the second washcoat is located within walls of the substrate and a second portion of the second washcoat is located on the walls of the substrate. In some embodiments, the second washcoat is located within walls of the substrate. In some embodiments, the first washcoat is located on the walls of the substrate.

In another aspect of the present disclosure is provided an exhaust gas treatment system, comprising the catalyst article as disclosed herein above downstream of a urea injector and in fluid communication with an internal combustion engine. Such an exhaust gas treatment system can comprise various other additional components. For example, in some embodiments, the system further comprises a component selected from the group consisting of a diesel oxidation catalyst, a soot filter, an ammonia oxidation catalyst, a lean $NO_x$ trap, and any combination thereof. The internal combustion engine, in some embodiments, is a diesel engine.

In a further aspect of the disclosure is provided a method of preparing a SCRoF with enhanced low temperature and high temperature $NO_x$ conversion, comprising: coating a first washcoat comprising a copper trapping component onto at least a portion of a wall-flow filter substrate, wherein the copper trapping component comprises a plurality of particles having a $D_{90}$ particle size of about 0.5 to 20 microns, to give a pre-coated wall-flow filter substrate; and coating the pre-coated wall flow filter substrate with a second washcoat, comprising a zeolite having sufficient Cu exchanged into cation sites of the zeolite such that the zeolite has a Cu/Al ratio of 0.1 to 0.5 and a CuO loading of 1 to 15 wt. %; and calcining the coated wall-flow filter substrate to give the SCRoF. In a still further aspect is provided a method of preparing a SCRoF with enhanced low temperature and high temperature $NO_x$ conversion, comprising: coating a washcoat comprising a mixture of a copper trapping component and a zeolite onto a wall-flow filter substrate, wherein the copper trapping component comprises a plurality of particles having a $D_{90}$ particle size of about 0.5 to 20 microns, and wherein the zeolite component comprises sufficient Cu exchanged into cation sites of the zeolite such that the zeolite has a Cu/Al ratio of 0.1 to 0.5 and a CuO loading of 1 to 15 wt. %; and calcining the coated wall-flow filter substrate to give the SCRoF. In some such embodiments, the copper trapping component is alumina. The step of coating with the copper trapping component can, in some embodiments, be conducted so as to provide an alumina pre-coating of about 0.05 g/in$^3$ to about 0.5 g/in$^3$ alumina on the wall flow filter substrate.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

Figure 1:
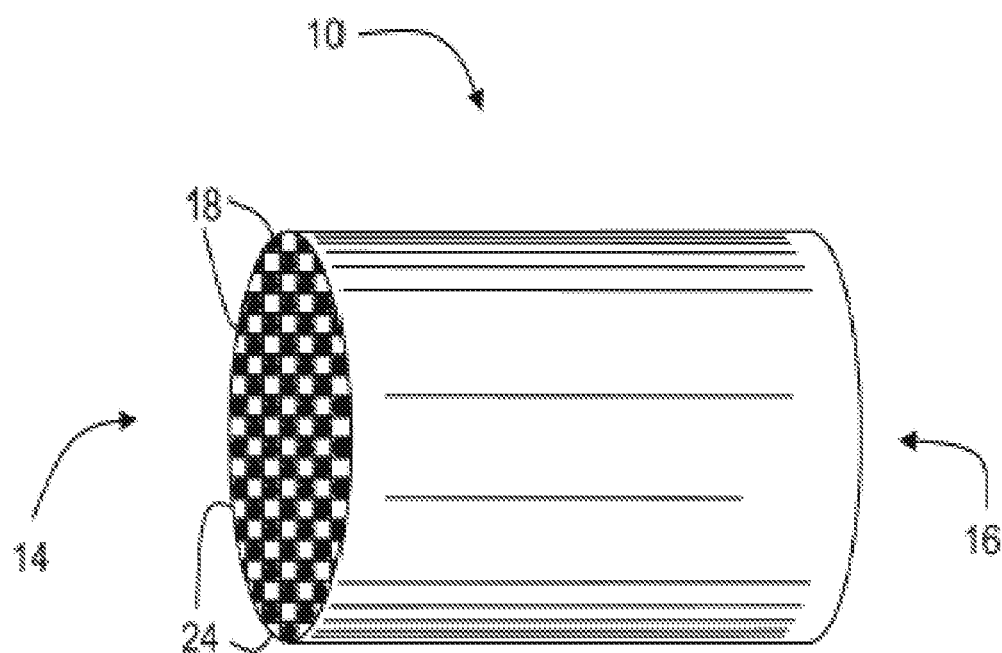
FIG. 1 illustrates an external view of an embodiment of a wall flow filter substrate having an inlet end and an outlet end.

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates.

The present disclosure generally provides catalyst compositions, e.g., SCR catalyst compositions, suitable for at least partial conversion of $NO_x$ emissions from an engine, such as a diesel engine. The catalyst compositions generally comprise one or more metal-promoted molecular sieves (e.g., zeolites), and can be prepared and coated onto a substrate using a washcoat technique as set forth more fully below. Particular embodiments described herein employ such catalyst compositions as coatings on wall-flow filter substrates, providing catalyzed wall-flow filters, i.e., Selective Catalytic Reduction catalyst on Filter (SCRoF) articles. The catalyst compositions disclosed herein can provide effective high and/or low temperature performance, depending on the particular physical properties of the catalyst compositions and, in particular, in certain embodiments, depending on the porosity (and in particular, on the microporosity) of the catalyst composition. The disclosed compositions include a copper trapping agent, such as alumina and can, in some embodiments, exhibit improved $NO_x$ conversion (at high and/or low temperature) and/or reduced $N_2O$ formation as compared with a comparable composition without such an added copper trapping agent.

One aspect of the present disclosure is the recognition that ion exchanged copper within zeolite structures is mobile under high temperature hydrothermal conditions. Without being bound by a specific mechanism, when copper comes out of the zeolite lattice, it is believed to form small CuO clusters that become active for $NH_3$ oxidation, and loss of SCR activity. In addition, when copper is removed from the zeolite ion exchange sites, under hydrothermal conditions, it destabilizes the structure, which causes dealumination, loss of zeolite crystallinity and zeolitic surface area, and therefore loss of SCR activity. To minimize formation of small CuO clusters, the invention recognizes that the mobile CuO can be trapped, fixed or sequestered as a ternary copper oxide by a suitable metal oxide, i.e., a "copper trapping agent," as referenced above, forming an ABxOy structure where A=Cu and B=a second metal. Metal oxides known to form ternary metal oxides are: $Y_2O_3$, $CeO_2$, $TiO_2$, $ZrO_2$, $V_2O_5$, $Nb_2O_5$, $Ta_2O_5$, $Cr_2O_3$, $Nb_2O_5$, $WO_3$, $Mn_2O_3$, $Fe_2O_3$, $Co_2O_3$, $Al_2O_3$, $Ga_2O_3$, $SiO_2$, and $Bi_2O_3$. As such, although the application focuses largely on the inclusion of alumina as providing this function, it is understood that the principles, compositions, and methods disclosed herein are applicable as well to the metal oxide referenced above.

It is generally understood that catalyst compositions exhibit some degree of porosity which, following the IUPAC definition of pore sizes, can be described as being commonly in the form of macroporosity (containing pores with diameters greater than 50 nm) and/or mesoporosity (containing pores with diameters of 2 nm to 50 nm) and/or microporosity (containing pores with diameters of about 2 nm or less). Macroporosity and mesoporosity are known to be important for mass transfer considerations and microporosity affects access to catalyst sites and thus, catalytic activity. As described herein, inclusion of alumina within a metal-promoted molecular sieve-containing catalyst composition can lead to a composition washcoat with remarkably higher zeolitic surface area (ZSA) as compared with a corresponding composition washcoat without inclusion of alumina, particularly after severe aging (e.g., aging to 800° C. or more). Further, as described herein, inclusion of alumina in a washcoat layer adjacent to a composition washcoat comprising a metal-promoted molecular-sieve containing catalyst composition can similarly exhibit improved $NO_x$ conversion and/or reduced $N_2O$ formation.

This disclosure describes modifications of the alumina content of a catalyst composition, which has been found to result in modification of the microporosity of the catalyst composition (as defined by ZSA in m$^2$/g). By altering the alumina content and, thus, altering the ZSA of the catalyst composition (particularly in aged form), different catalytic activity has been observed. Specifically, catalysts with added alumina, exhibiting higher ZSA values, are demonstrated herein to have improved SCR performance, namely, increased $NO_x$ conversion and/or decreased $N_2O$ make.

"ZSA" as used herein is the "zeolitic surface area," and can be expressed in m$^2$/g, m$^2$/in$^3$, or simply in m$^2$ where objects of equal size by weight or volume are compared. ZSA refers to surface area associated primarily with the micropores of a zeolite (typically about 2 nm or less in diameter). Although "ZSA" refers by name specifically to "zeolite" surface area, this term is intended to be more broadly applicable to molecular sieve surface areas generally. Methods of evaluating ZSA are disclosed throughout the present specification.

Catalyst Composition

The catalyst compositions disclosed herein generally comprise molecular sieves and a copper trapping component, e.g., alumina. The molecular sieves and copper trapping component can be contained within the same washcoat layer or can be contained within separate washcoat layers, which together comprise a "catalyst composition" for the purposes of the present disclosure. Advantageously, the present disclosure relates particularly to layered structures, wherein the catalyst composition comprises a copper trapping component-containing "pre-coat" on a substrate, with a molecular sieve-containing coating disposed on at least a portion of the pre-coat. It is noted that the disclosure refers to "a copper trapping component" as being present within the catalyst compositions; it is to be understood that this nomenclature is relevant where, e.g., the molecular sieve is copper-promoted. However, the types of "copper trapping components" referenced herein below are not understood to require copper promotion of the zeolites and "copper trapping components" may be useful and relevant wherein the molecular sieve is promoted with another type of metal, e.g., iron.

With respect to the molecular sieve component of the disclosed catalyst compositions, the molecular sieves generally comprise metal-promoted (e.g., Cu-promoted, Fe-promoted or Cu/Fe-promoted) molecular sieves. In particularly preferred embodiments, the molecular sieves are copper promoted. The phrase "molecular sieve," as used herein refers to framework materials such as zeolites and other framework materials (e.g. isomorphously substituted materials), which may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Å. The pore sizes are defined by the ring size. As used herein, the term "zeolite" refers to a specific example of a molecular sieve, further including silicon and aluminum atoms. According to one or more embodiments, it will be appreciated that defining the molecular sieves by their structure type is intended to include both molecular sieves having that structure type and any and all isotypic framework materials such as SAPO, AlPO and MeAPO materials having the same structure type.

In more specific embodiments, reference to an aluminosilicate zeolite structure type limits the material to molecular sieves that do not purposely include phosphorus or other metals substituted in the framework. To be clear, as used herein, "aluminosilicate zeolite" excludes aluminophosphate materials such as SAPO, AlPO, and MeAPO materials, and the broader term "zeolite" is intended to include aluminosilicates and aluminophosphates. Zeolites are crystalline materials, understood to be aluminosilicates with open 3-dimensional framework structures composed of corner-sharing $TO_4$ tetrahedra, where T is Al or Si. Zeolites generally comprise silica to alumina (SAR) molar ratios of 2 or greater. Zeolites for use in the disclosed catalyst compositions are not particularly limited in terms of SAR values, although the particular SAR value associated with a zeolite may, in some embodiments, affect the SCR performance of the catalyst composition into which it is incorporated (e.g., particularly after aging). In some embodiments, the SAR values of the zeolites are from about 5 to about 100 or about 5 to about 50. In some embodiments, the SAR is 5 to 20 and, in other embodiments, the SAR is 20-50. Cations that balance the charge of the anionic framework are loosely associated with the framework oxygens, and the remaining pore volume may be potentially filled with water molecules. The non-framework cations are generally exchangeable, and the water molecules removable. Zeolites typically have rather uniform pore sizes which, depending upon the type of zeolite and the type and amount of cations included in the zeolite lattice, range from about 3 to 10 Angstroms in diameter.

Molecular sieves can be classified by means of the framework topology by which the structures are identified. Typically, any structure type of zeolite can be used, such as structure types of ABW, ACO, AEI, AEL, AEN, AET, AFG, AFI, AFN, AFO, AFR, AFS, AFT, AFX, AFY, AHT, ANA, APC, APD, AST, ASV, ATN, ATO, ATS, ATT, ATV, AWO, AWW, BCT, BEA, BEC, BIK, BOG, BPH, BRE, CAN, CAS, SCO, CFI, SGF, CGS, CHA, CHI, CLO, CON, CZP, DAC, DDR, DFO, DFT, DOH, DON, EAB, EDI, EMT, EON, EPI, ERI, ESV, ETR, EUO, FAU, FER, FRA, GIS, GIU, GME, GON, GOO, HEU, IFR, IHW, IS V, ITE, ITH, ITW, IWR, IWW, JBW, KFI, LAU, LEV, LIO, LIT, LOS, LOV, LTA, LTL, LTN, MAR, MAZ, MEI, MEL, MEP, MER, MFI, MFS, MON, MOR, MOZ, MSO, MTF, MTN, MTT, MTW, MWW, NAB, NAT, NES, NON, NPO, NSI, OBW, OFF, OSI, OSO, OWE, PAR, PAU, PHI, PON, RHO, RON, RRO, RSN, RTE, RTH, RUT, RWR, RWY, SAO, SAS, SAT, SAV, SBE, SBS, SBT, SFE, SFF, SFG, SFH, SFN, SFO, SGT, SOD, SOS, SSY, STF, STI, STT, TER, THO, TON, TSC, UEI, UFI, UOZ, USI, UTL, VET, VFI, VNI, VSV, WIE, WEN, YUG, ZON, or combinations thereof. In certain embodiments, the structure type is selected from AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations thereof. Existing intergrowths of these materials, e.g., including, but not limited to AEI-CHA are also intended to be encompassed herein.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites have a single 4-ring (s4r) composite building unit in their framework structure. In the 4-ring, the "4" denotes the positions of tetrahedral silicon and aluminum atoms, and the oxygen atoms are located between tetrahedral atoms. Other composite building units include, for example, a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms. Zeolitic structure types that have a d6r secondary building unit include AEI, AFT, AFX, CHA, EAB, EMT, ERI, FAU, GME, JSR, KFI, LEV, LTL, LTN, MOZ, MSO, MWW, OFF, SAS, SAT, SAV, SBS, SBT, SFW, SSF, SZR, TSC, and WEN. In one or more specific embodiments of the present disclosure, the molecular sieves of the catalyst compositions have the CHA structure type. In particular embodiments, the molecular sieves have the CHA structure type and are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

In certain embodiments, the zeolite of the disclosed catalyst compositions comprises a small pore zeolite. A small pore zeolite contains channels defined by up to eight tetrahedral atoms. The phrase "8-ring" zeolite refers to a zeolite having 8-ring pore openings and in some cases the "8-ring" zeolite may also comprise double-six ring secondary building units and may have a cage like structure resulting from the connection of double six-ring building units by 4 rings. Exemplary small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof. For example, in certain embodiments, the zeolite comprises a small pore zeolite with a framework type selected from the group consisting of CHA, LEV, AEI, AFT, AFX, ERI, SFW, KFI, DDR, ITE, and mixtures or intergrowths thereof.

In certain embodiments, the zeolite of the disclosed catalyst compositions comprises a medium pore zeolite. A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN and mixtures or intergrowths thereof. For example, in certain embodiments, the zeolite comprises a medium pore zeolite with a framework type selected from FER, MEL, MFI, STT, and mixtures or intergrowths thereof.

In certain embodiments, the zeolite of the disclosed catalyst compositions comprises a large pore zeolite. A large pore zeolite contains channels defined by twelve-membered rings. Exemplary large pore zeolites include framework types AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and mixtures or intergrowths thereof. For example, in certain embodiments, the zeolite comprises a large pore zeolite with a framework type selected from BEA, FAU, MOR and mixtures or intergrowths thereof.

As referenced herein above, the disclosed catalyst compositions generally comprise molecular sieves (e.g., zeolites) that are metal-promoted. As used herein, "promoted" refers to a molecular sieve comprising one or more components that are intentionally added, as opposed to comprising impurities that may be inherent in the molecular sieve. Thus, a promoter is a component that is intentionally added to enhance the activity of a catalyst, compared to a catalyst that does not have promoter intentionally added. In order to promote the SCR of oxides of nitrogen, in one or more embodiments according to the present disclosure, a suitable metal is exchanged into the molecular sieves. Copper participates in the conversion of nitrogen oxides and thus may be a particularly useful metal for exchange. Accordingly, in particular embodiments, a catalyst composition is provided which comprises a copper-promoted molecular sieve (e.g., zeolite), e.g., Cu-CHA. However, the invention is not intended to be limited thereto, and catalyst compositions comprising other metal-promoted molecular sieves are also encompassed hereby.

Promoter metals can generally be selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. Certain promoter metals that can, in various embodiments, be used to prepare metal-promoted molecular sieves include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. Combinations of such metals can be employed, e.g., copper and iron, giving a mixed Cu—Fe-promoted molecular sieve, e.g., Cu—Fe-CHA. In certain embodiments, the promoter metal associated with the disclosed zeolite component comprises copper (e.g., as CuO), iron (e.g., as $Fe_2O_3$), or manganese (e.g., as $MnO_2$).

The promoter metal content of a metal-promoted molecular sieve, calculated as the oxide, is, in one or more embodiments, at least about 0.1 wt. %, based on the total weight of the calcined molecular sieve (including promoter) and reported on a volatile-free basis. In specific embodiments, the promoter metal of the zeolite component comprises Cu, and the Cu content, calculated as CuO is in the range of about 0.1 wt. % to about 20 wt. %, including about 0.5 wt. % to about 17 wt. %, about 2 wt. % to about 15 wt. %, or about 2 wt. % to about 10 wt. %, in each case based on the total weight of the calcined molecular sieve reported on a volatile free basis. In some embodiments, the zeolite component (including promoter metal) can be defined by the ratio of promoter metal to aluminum within the promoted zeolite. For example, in some embodiments, the promoter metal to aluminum molar ratio is about 0.1 to about 0.5 (e.g., the Cu/Al ratio is about 0.1 to about 0.5).

The copper trapping component of the disclosed catalyst composition can vary. In preferred embodiments, the copper trapping component is alumina or silica-alumina. The discussion below focuses on alumina as the copper trapping component; however, it is to be understood that the features and parameters discussed herein below are not intended to be limited thereto, and can apply also to other "copper trapping components." The alumina can be, for example, boehmite, gamma-alumina, delta/theta alumina, transitional or stabilized alumina, doped alumina (e.g., silica-doped alumina), or a combination thereof. In certain embodiments, the alumina component in the disclosed compositions is in the form of "gamma alumina" or "activated alumina," which typically exhibits a BET surface area in excess of 60 square meters per gram ("$m^2/g$"), often up to about 200 $m^2/g$ or higher. "BET surface area" has its usual meaning of referring to the Brunauer, Emmett, Teller method for determining surface area by $N_2$ adsorption. In one or more embodiments, the BET surface area ranges from about 100 to about 150 $m^2/g$. Such activated alumina is usually a mixture of the gamma and delta phases of alumina, but may also contain substantial amounts of eta, kappa and theta alumina phases. Useful commercial alumina includes high surface area alumina, such as high bulk density gamma-alumina, and low or medium bulk density large pore gamma-alumina. Generally, the alumina component of the disclosed catalyst composition is not a binder alumina. A binder alumina is typically in the form of soluble alumina (e.g., $Al(NO_3)_3$ or a dispersible colloidal alumina typically having a $D_{90}$ particle size in the range of 5-50 nm. On the other hand, in the alumina component of the disclosed catalyst composition, the disclosed alumina is generally non-dispersible and has an agglomerate size $D_{10}$>0.1 microns.

Typically, the alumina component of the disclosed catalyst composition is substantially free of any active metal associated therewith. "Substantially free" means "little or no" or "no intentionally added" and also having only trace and/or inadvertent amounts. For instance, in certain embodiments, "substantially free" means less than 2 wt. % (weight %), less than 1.5 wt. %, less than 1.0 wt. %, less than 0.5 wt. %, 0.25 wt. % or less than 0.01 wt. % metal associated with the alumina component, based on the weight of the indicated total composition. As such, the alumina component advantageously is not intentionally added so as to act as a support for any metal species (e.g., active metal) and, in some such embodiments, the alumina component is referred to herein as a "free alumina" component (i.e., being substantially free of active metal species).

In some embodiments, the alumina is present in the form of particles, which can, in some embodiments, be as large as 20 micrometers. The alumina can have a $D_{90}$ particle size distribution, e.g., of about 0.5 microns to about 20 microns. Particle size refers to primary particles. Particle size may be measured by laser light scattering techniques, with dispersions or dry powders, for example according to ASTM method D4464. D90 particle size distribution indicates that 90% of the particles (by number) have a Feret diameter below a certain size as measured by Scanning Electron Microscopy (SEM) or Transmission Electron Microscopy (TEM) for submicron size particles; and a particle size analyzer for micron size particles.

The relative amount of promoted zeolite and alumina component in the disclosed catalyst compositions can vary. In some embodiments, the alumina component is present in an amount of about 1 to 50 weight percent of the catalyst composition, e.g., about 1 to about 20 weight percent of the catalyst composition; about 5 to about 15 weight percent of the catalyst composition; or about 5 to about 10 weight percent of the catalyst. Exemplary alumina contents in the disclosed catalyst composition are at least about 1 percent by weight, at least about 5 percent by weight, at least about 10 percent by weight, at least about 12 percent by weight, or at least about 15 percent by weight, based on the total weight of the catalyst composition.

In some embodiments, the amount of promoted zeolite within the catalyst composition can be reduced relative to a comparable catalyst composition comprising only the promoted zeolite without the alumina component disclosed herein, while achieving comparable or better catalytic activity (e.g., comparable or increased $NO_x$ conversion and/or comparable or lower $N_2O$ make). As such, in some embodiments, it may be possible to reduce the amount of metal-promoted zeolite component as the amount of alumina within the disclosed composition is increased. For example, increasing the amount of alumina in the catalyst composition may directly reduce the amount of zeolite by the same amount. In other words, in some embodiments, a portion of the promoted zeolite in a comparable catalyst composition is replaced by an alumina component as disclosed herein and the resulting catalyst composition can exhibit comparable or better SCR activity. However, in other embodiments, the alumina is added such that the promoted zeolite of the inventive and comparative compositions is provided in comparable amounts. In such embodiments, increasing the amount of alumina in the catalyst composition (while maintaining the same amount of promoted zeolite) can provide a catalyst composition with comparable or better SCR activity.

In some embodiments, the disclosed catalyst composition comprises a mixture of the promoted zeolite and the alumina component. In some embodiments, the disclosed catalyst composition comprises separate formulations, wherein one formulation comprises the active SCR catalyst components (e.g., the promoted zeolite(s)), and a second formulation comprises the alumina component. For example, in one particular embodiment, a formulation comprising the alumina component is present as a "pre-coating" on at least a portion of the substrate, and a formulation comprising a promoted zeolite is applied thereto to give the desired catalyst composition. By "pre-coating" means that a first washcoat comprising the alumina is applied directly to the substrate (with one or more additional washcoats, including a washcoat comprising the promoted zeolite, applied to at least a portion of the "pre-coat").

Substrate

According to one or more embodiments, the substrate (onto which the disclosed catalyst composition is applied to give a catalytic article, e.g., an SCR catalytic article such as an SCRoF) may be constructed of any material typically used for preparing automotive catalysts and will typically comprise a metal or ceramic honeycomb structure. As used herein, the term "substrate" refers to a monolithic material onto which the catalyst composition is applied, typically in the form of a washcoat. The substrate typically provides a plurality of wall surfaces upon which a SCR washcoat composition (e.g., comprising the metal-promoted molecular sieve disclosed herein above) is applied and adhered, thereby acting as a carrier for the catalyst composition.

Exemplary metallic substrates include heat resistant metals and metal alloys, such as titanium and stainless steel as well as other alloys in which iron is a substantial or major component. Such alloys may contain one or more of nickel, chromium, and/or aluminum, and the total amount of these metals may advantageously comprise at least 15 wt. % of the alloy, e.g., 10-25 wt. % of chromium, 3-8 wt. % of aluminum, and up to 20 wt. % of nickel. The alloys may also contain small or trace amounts of one or more other metals, such as manganese, copper, vanadium, titanium and the like. The surface or the metal carriers may be oxidized at high temperatures, e.g., 1000° C. and higher, to form an oxide layer on the surface of the substrate, improving the corrosion resistance of the alloy and facilitating adhesion of the washcoat layer to the metal surface. Ceramic materials used to construct the substrate may include any suitable refractory material, e.g., cordierite, mullite, cordierite-α alumina, silicon carbide, aluminum titanate, silicon nitride, zircon mullite, spodumene, alumina-silica magnesia, zircon silicate, sillimanite, magnesium silicates, zircon, petalite, α alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which can be of any suitable cross-sectional shape, such as trapezoidal, rectangular, square, sinusoidal, hexagonal, oval, circular, and the like. Such structures may contain from about 60 to about 1200 or more gas inlet openings (i.e., "cells") per square inch of cross section (cpsi), more usually from about 300 to 600 cpsi. The wall thickness of flow-through substrates can vary, with a typical range being between 0.002 and 0.01 inches. A representative commercially-available flow-through substrate is a cordierite substrate having 400 cpsi and a wall thickness of 4-6 mil, or 600 cpsi and a wall thickness of 3-4 mil. However, it will be understood that the invention is not limited to a particular substrate type, material, or geometry.

Figure 2:
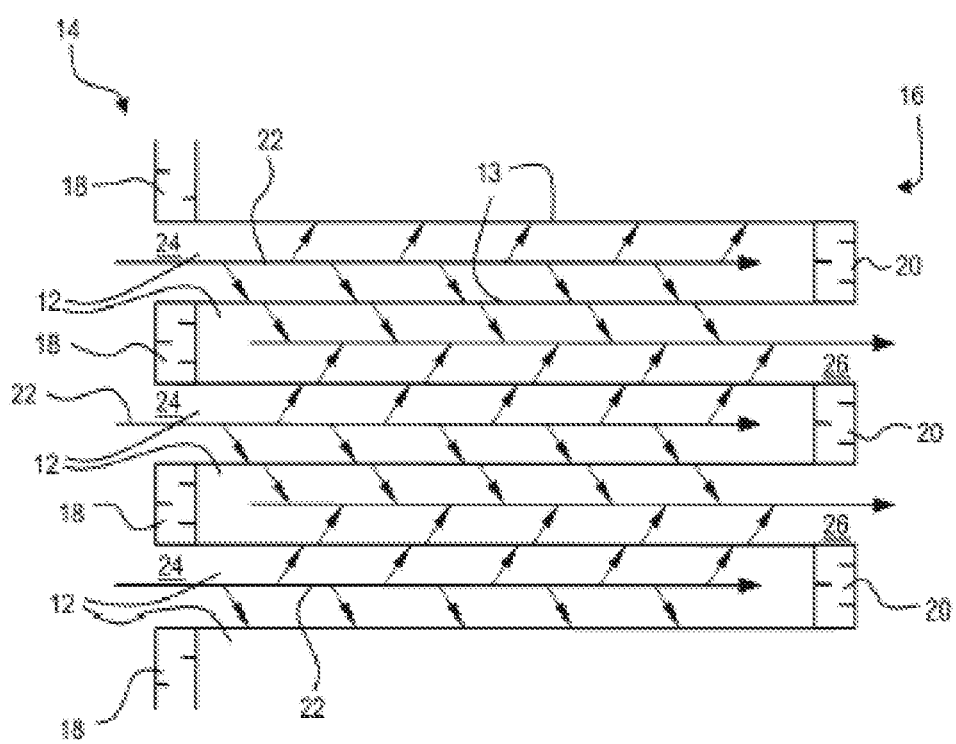
FIG. 2 illustrates a cross-sectional view of an exemplary embodiment of a plurality of porous walls extending longitudinally from an inlet end to an outlet end of a wall flow filter substrate.

FIGS. 1 and 2 illustrate a typical wall flow filter substrate 10 (also referred to as a wall flow filter) which has a plurality of passages 12. The passages are formed and tubularly enclosed by the internal walls 13 of the filter substrate. FIG. 1 depicts an external view of an embodiment of a wall flow filter substrate having an inlet end 14 and an outlet end 16. Alternate passages are plugged at the inlet end with inlet plugs 18 (shown in black), and at the outlet end with outlet plugs 20 to form opposing checkerboard patterns at the inlet 14 and outlet 16 ends of the substrate.

FIG. 2 illustrates a cross-sectional view of an embodiment of a plurality of porous walls extending longitudinally from an inlet end to an outlet end of a wall flow filter substrate. A partial cross-sectional view of an embodiment of a plurality of porous walls 13 extending longitudinally from an inlet end 14 to an outlet end 16, and forming a plurality of parallel passages 12 is shown. A gas stream 22 (shown as arrows) enters through the open, unplugged end of inlet passages 24, is stopped at the closed end by outlet plug 20, and diffuses through the porous walls 13 forming the passages to the outlet passages 26. The gas stream 22 exits the filter by flowing through the open, unplugged end of outlet passages 26, and is stopped at the closed end by inlet plug 18. The gas is prevented from flowing backwards to the inlet end of the filter from the outlet passages by the inlet plugs 18, and prevented from re-entering the inlet passages from the outlet end by the outlet plugs 20. In this manner, a quantity of the passages are inlet passages that are open at the inlet end and closed at the outlet end, and a quantity of passages are outlet passages that are closed at the inlet end and open at the outlet end, where the outlet passages are different passages than the inlet passages.

Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.008 and 0.02 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the present disclosure is not limited to a particular substrate type, material, or geometry. Note that where the substrate is a wall-flow substrate, the catalyst composition associated therewith can permeate into the pore structure of the porous walls (i.e., partially or fully occluding the pore openings) in addition to being disposed on the surface of the walls.

The wall-flow filter article substrate may have a volume of, for instance, from about 50 cm³, about 100 cm³, about 200 cm³, about 300 cm³, about 400 cm³, about 500 cm³, about 600 cm³, about 700 cm³, about 800 cm³, about 900 cm³ or about 1000 cm³ to about 1500 cm³, about 2000 cm³, about 2500 cm³, about 3000 cm³, about 3500 cm³, about 4000 cm³, about 4500 cm³ or about 5000 cm³. In some embodiments, the wall-flow filter article substrate may have a volume of 2.0 L, 2.5 L, 5.0 L, 10 L, 20 L, or 30 L; and it is to be understood that all volumes between any two of these exemplary values is also contemplated by the invention. Wall-flow filter substrates typically have a wall thickness from about 200 microns to about 500 microns, for example from about 200 microns to about 300 microns.

The walls of a wall-flow filter are porous and generally have a wall porosity of at least about 50% or at least about 60% with an average pore size of at least about 5 microns prior to disposition of the functional coating. For instance, the wall-flow filter article substrate in some embodiments will have a porosity of ≥50%, ≥60%, ≥65% or ≥70%. For instance, the wall-flow filter article substrate will have a wall porosity of from about 50%, about 60%, or about 65% to about 70% and an average pore size of from about 10 microns, about 20 microns, or about 25 microns to about 30 microns prior to disposition of a catalytic coating. The terms "wall porosity" and "substrate porosity" mean the same thing and are interchangeable. Porosity is the ratio of void volume divided by the total volume of a substrate. Pore size may be determined according to ISO15901-2 (static volumetric) procedure for nitrogen pore size analysis. Nitrogen pore size may be determined on Micromeritics TRISTAR 3000 series instruments. Nitrogen pore size may be determined using BJH (Barrett-Joyner-Halenda) calculations and 33 desorption points. Useful wall-flow filters have high porosity, allowing high loadings of catalyst compositions without excessive backpressure during operation.

In particular embodiments, a wall-flow filter is provided which comprises a catalyst composition comprising a copper trapping component (e.g., alumina) as disclosed herein. Such a coated filter, commonly referred to as an SCRoF (i.e., selective catalytic reduction catalyst (SCR) on filter) can, in some embodiments, exhibit enhanced $NO_x$ conversion with respect to a coated filter comprising a catalyst composition without added copper trapping component (e.g., alumina).

In one embodiment, the catalyst composition is provided such that the alumina is in admixture with the other components of the catalyst composition. It is noted that, in such embodiments, the SCRoF can advantageously increase high-temperature $NO_x$ conversion as compared with an SCRoF comprising a catalyst composition without alumina.

In one embodiment, a filter is provided wherein alumina is provided as a first washcoat, also referred to herein as a "pre-coating" (disposed directly on/adjacent to the substrate), and a zeolite-containing washcoat is coated on top of at least a portion of the alumina pre-coating. The loading of this alumina coating can form a layer or partial layer within the microstructure of the filter walls or near the surface of the walls. The loading of the alumina washcoat can vary from about 0.05 g/in³ to about 0.5 g/in³ alumina, such as about 0.15 g/in³ alumina. In some embodiments, the layer thickness can be difficult to exactly characterize, e.g., due to the filter microstructure. The alumina in the first washcoat can have particle sizes, for example, with a $D_{90}$ of about 0.5 to about 20 μm. Such an SCRoF, in some embodiments, exhibits improved low-temperature SCR activity as compared with a catalyst composition without alumina (e.g., comprising the same types/amounts of other components).

Method of Making a SCR Composition

According to the present disclosure, a SCR catalyst composition is generally prepared by Providing a metal-promoted molecular sieve material. A molecular sieve having the CHA structure may be prepared according to various techniques known in the art, for example U.S. Pat. No. 4,544,538 to Zones and U.S. Pat. No. 6,709,644 to Zones, as well as U.S. Pat. No. 8,883,119 to Bull et al., which are herein incorporated by reference in their entireties. Methods of preparing other types of molecular sieves are known in the art and can be readily employed to provide the desired zeolite framework for inclusion within the disclosed composition.

To prepare metal-promoted molecular sieves according to various embodiments of the invention, a metal (e.g., copper) is ion exchanged into the molecular sieves. Such metals are generally ion exchanged into alkali metal or $NH_4$ molecular sieves (which can be prepared by $NH_4^+$ ion exchange into an alkali metal molecular sieve by methods known in the art, e.g., as disclosed in Bleken, F. et al. Topics in Catalysis 2009, 52, 218-228, which is incorporated herein by reference).

Preparation of metal-promoted molecular sieves typically comprises an ion-exchange process of the molecular sieves in particulate form with a metal precursor solution. For example, a copper salt can be used to provide copper. When copper acetate is used to provide copper, the copper concentration of the liquid copper solution used in the copper ion-exchange is in specific embodiments in the range from about 0.01 to about 0.4 molar, more specifically in the range from about 0.05 to about 0.3 molar, even more specifically in the range from about 0.1 to about 0.25 molar, even more specifically in the range from about 0.125 to about 0.25 molar, even more specifically in the range from about 0.15 to about 0.225 molar and even more specifically at approximately about 0.2. In specific embodiments, a metal, such as copper, is ion exchanged into alkali metal or $NH_4^+$-Chabazite to form Cu-Chabazite.

For additional promotion of SCR of oxides of nitrogen, in some embodiments, the molecular sieves can be promoted with two or more metals (e.g., copper in combination with one or more other metals). Where two or more metals are to be included in a metal ion-promoted molecular sieve material, multiple metal precursors (e.g., copper and iron precursors) can be ion-exchanged at the same time or separately, in multiple exchange steps. In certain embodiments, the second metal can be exchanged into a molecular sieve material that has first been promoted with the first metal (e.g., a second metal can be exchanged into a copper-promoted molecular sieve material). The second molecular sieve material can vary and, in some embodiments, may be a transition metal (e.g., iron or manganese) or an alkaline earth or alkali metal.

Substrate Coating Process

As referenced above, the catalyst composition is prepared and coated on a substrate. This method can comprise mixing a catalyst composition (or one or more components of the catalyst composition) as generally disclosed herein with a solvent (e.g., water) to form a slurry for purposes of coating a catalyst substrate. As referenced above, the metal-promoted zeolite component and the alumina component can be prepared within the same slurry or within separate slurries, i.e., leading to one washcoat or independent washcoats on the substrate, respectively. In some embodiments, one slurry is provided which comprises the copper trapping component (e.g., alumina) and a second slurry is provided which comprises the metal-promoted zeolite component, and which may optionally further comprise additional alumina component (which may be the same as or different than the alumina component in the first slurry).

In addition to the catalyst component(s) (i.e., the metal-promoted molecular sieves and/or copper trapping component) within a given washcoat slurry, the slurry may optionally contain various additional components. Typical additional components include, but are not limited to, one or more binders and additives to control, e.g., pH and viscosity of the slurry. Particular additional components can include binders (e.g., silica, titania, zirconia, or a combination thereof, typically in an amount of about 0.1 to about 10 weight percent, based on the weight of the washcoat), associative thickeners, and/or surfactants (including anionic, cationic, non-ionic or amphoteric surfactants) and zirconium acetate.

The slurry can, in some embodiments be milled to enhance mixing of the particles and formation of a homogenous material. The milling can be accomplished in a ball mill, continuous mill, or other similar equipment, and the solids content of the slurry may be, e.g., about 20-60 wt. %, more particularly about 30-40 wt. %. In one embodiment, the post-milling slurry is characterized by a $D_{90}$ particle size of about 5 to about 50 microns (e.g., about 5 to about 20 microns or about 10 to about 20 microns).

The slurry is generally coated on the catalyst substrate using a washcoat technique known in the art. As used herein, the term "washcoat" has its usual meaning in the art of a thin, adherent coating of a material (e.g., a catalytic material) applied to a substrate, such as a honeycomb flow-through monolith substrate or a filter substrate which is sufficiently porous to permit the passage therethrough of the gas stream being treated. As used herein and as described in Heck, Ronald and Robert Farrauto, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can have unique chemical catalytic functions.

A washcoat is generally formed by preparing a slurry containing a specified solids content (e.g., 30-60% by weight) of catalyst material (here, the metal-promoted zeolite component, the alumina component, or both) in a liquid vehicle, which is then coated onto the substrate (or substrates) and dried to provide a washcoat layer. To coat the wall flow substrates with the catalyst material of one or more embodiments, the substrates can be immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate" when used to describe the dispersion of the catalyst slurry on the substrate, means that the catalyst composition is dispersed throughout the wall of the substrate.

Thereafter, the coated substrate is dried at an elevated temperature (e.g., 100-150° C.) for a period of time (e.g., 10 min-3 hours) and then calcined by heating, e.g., at 400-600° C., typically for about 10 minutes to about 3 hours. Following drying and calcining, the final washcoat coating layer can be viewed as essentially solvent-free.

After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

Aging can be conducted under various conditions and, as used herein, "aging" is understood to encompass a range of conditions (e.g., temperature, time, atmosphere). Exemplary aging protocols involve subjecting the calcined coated substrate to a temperature of 750° C. for about 5 hours in 10% steam or to a temperature of 800° C. for about 16 hours in 10% steam. However, these protocols are not intended to be limiting and the temperature can be lower or higher (e.g., including but not limited to, temperatures of 400° C. and higher, e.g., 400° C. to 1000° C., 600° C. to 950° C., or 650° C. to 800° C.); the time may be lesser or greater (e.g., including but not limited to, times of about 1 hour to about 100 hours or about 2 hours to about 50 hours); and the atmosphere can be modified (e.g., to have different amounts of steam and/or other constituents present therein).

Catalyst Articles

The resulting catalyst articles (comprising one or more washcoat layers on a substrate, providing a substrate coated with a catalyst composition) can have varying configurations. In some embodiments, as referenced herein, all components of the disclosed catalyst composition (including the metal-promoted zeolite component and the copper trapping component) are contained within a single catalyst composition washcoat layer (i.e., a mixture), which is provided as one or more layers on the substrate. In some embodiments, a catalyst article is provided wherein the catalyst composition coated on the substrate comprises separate washcoat layers, wherein at least one washcoat layer comprises the metal-promoted zeolite component and at least one (separate) washcoat layer comprises the alumina component. For example, in one specific embodiment, a first catalyst composition washcoat layer, comprising the alumina component, is directly in contact with the substrate, and a second catalyst composition washcoat layer, comprising the metal-promoted zeolite component, is directly on at least a portion of the first catalyst composition washcoat layer. In this specific embodiment, one exemplary catalytic article comprises a substrate having an alumina-containing washcoat layer disposed directly on the surface thereof at a loading of 0.2 to 2.0 g/in$^3$, and a metal-promoted zeolite-containing washcoat layer disposed on the alumina-containing washcoat layer.

The washcoat(s) can be applied such that different coating layers may be in direct contact with the substrate. Alternatively, one or more "undercoats" may be present, so that at least a portion of a catalyst composition washcoat layer or layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Different catalyst composition washcoat layers may be in direct contact with each other without a "middle" overlapping zone. Alternatively, different catalyst composition washcoat layers may not be in direct contact, with a "gap" between the two zones. In the case of an "undercoat" or "overcoat" the gap between the different layers is termed an "interlayer." An undercoat is a layer "under" a catalyst composition washcoat layer, an overcoat is a layer "over" a catalyst composition washcoat layer and an interlayer is a layer "between" two catalyst composition washcoat layers. The interlayer(s), undercoat(s) and overcoat(s) may contain one or more functional compositions or may be free of functional compositions.

The catalytic coating may comprise more than one thin adherent layer, the layers in adherence to each other and the coating in adherence to the substrate. The entire coating comprises the individual "coating layers". The catalytic coating may advantageously be "zoned", comprising zoned catalytic layers. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Different layers may each extend the entire length of the substrate or may each extend a portion of the length of the substrate and may overlay or underlay each other, either partially or entirely. Each of the different layers may extend from either the inlet or outlet end.

Different catalytic compositions may reside in each separate coating layer. For example, one coating layer could comprise an SCR catalyst composition as disclosed herein (wherein the coating layer includes both the metal-promoted zeolite and alumina components) and a second layer could comprise another type of catalyst composition to provide a different catalytic functionality. As another example, two coatings could be provided to provide the catalyst composition disclosed herein (including one layer comprising the metal-promoted zeolite and a second layer comprising the alumina), and a third coating comprising another type of catalyst composition could be included to provide a different catalytic functionality. Thus, discussion related to different layers may correspond to any of these layers. The catalytic coating may comprise one, two or three or more coating layers. The one or more coating layers together comprise the catalytic compositions.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones. The present catalytic coatings may comprise more than one identical layer.

The resulting catalytic articles, comprising a catalyst composition as disclosed herein on a substrate, can advantageously, in some embodiments exhibit good SCR activity.

Although not intending to be limited by theory, it is believed that the enhanced SCR activity associated with the disclosed catalytic articles may, in some embodiments, be due to improved hydrothermal stability of the zeolite component. In this regard, catalyst articles comprising a metal-promoted zeolite commonly undergo severe deactivation upon aging (e.g., at 800° C. for 16 hours), as demonstrated by low $NO_x$ conversion after aging. Surprisingly, catalytic articles comprising a catalyst composition as disclosed herein (including both a metal-promoted zeolite component and an alumina component) have been found to maintain high activity (i.e., $NO_x$ conversion) under such aging conditions. This high activity has, in fact, been demonstrated in use at both high and low temperatures in various embodiments, including, in some embodiments, across the entire testing window of 200° C. to 600° C.

In certain embodiments, the disclosed catalytic articles further advantageously exhibit reduced $N_2O$ formation at low temperature and/or high temperature. For example, in the fresh state, certain alumina-containing samples show lower peak $N_2O$ formation at both low and high temperatures relative to the zeolite-only reference. After aging, all alumina-containing samples show lower $N_2O$ formation at high temperatures.

Although not intending to be limited by theory, it is believed that, in some embodiments, such improvements (i.e., increased $NO_x$ conversion and/or decreased $N_2O$ formation) may be associated with higher zeolitic surface area (ZSA) of the washcoat(s), particularly after calcination and aging. Thus, it is believed that, in certain embodiments, the activity of the catalyst can be affected by the ZSA of the washcoat(s) comprising the catalyst composition. ZSA, typically provided in units of $m^2/g$, $m^2/in^3$, or $m^2$, provides a measure of the micropore surface area (pores ≤2 nm in diameter). Methods of testing ZSA are described in detail in U.S. Provisional Patent Application 62/517,243, filed Jun. 9, 2017 to Petrovic et al., which is incorporated herein by reference in its entirety. Briefly, such methods involve testing ZSA without removing coatings from the substrate and without crushing the substrate before analysis by analyzing nitrogen partial pressure points to obtain the BET surface area and calculating the ZSA from the BET surface area. Such an effect of ZSA is observed, in particular, after severe aging (e.g., aging at 800° C. for 16 hours). For severely aged catalytic articles comprising the catalyst composition disclosed herein, it has been demonstrated that higher $NO_x$ conversion (at low and/or high temperatures) can be correlated with higher ZSA.

The foregoing effects associated with the inclusion of alumina in the disclosed metal-promoted zeolite-containing catalyst compositions/articles relate to both catalyst compositions/articles wherein the components are mixed and catalyst compositions/articles wherein the components are in separate washcoat layers, e.g., with the alumina component in a first washcoat layer on the substrate and the metal-promoted zeolite in a second washcoat layer on the first washcoat layer.

Emission Treatment System

Selective reduction of nitrogen oxides utilizing catalyst compositions according to the present disclosure is generally carried out in the presence of ammonia or urea. In particular, an SCR system including a catalyst composition prepared according to the methods described herein can be integrated in the exhaust gas treatment system of a vehicle. An exemplary SCR system can include the following components: an SCR catalyst composition as described herein; a urea storage tank; a urea pump; a urea dosing system; a urea injector/nozzle; and a respective control unit.

In some aspects, the present disclosure also can relate to a method for selectively reducing nitrogen oxides ($NO_x$) from a stream, such as an exhaust gas. In particular, the stream can be contacted with a catalyst composition prepared according to the present disclosure. The term nitrogen oxides, or $NO_x$, as used herein encompasses any and all oxides of nitrogen, including but not limited to $N_2O$, NO, $N_2O_3$, $NO_2$, $N_2O_4$, $N_2O_5$, and $NO_3$.

In some embodiments, a catalyst composition as described herein can be effective to provide a $NO_x$ conversion of at least 60%, at least 70%, at least 80%, at least 90%, at least 95%, or at least 99% over a temperature range of about 150° C. to about 650° C., about 200° C. to about 600° C., about 300° C. to about 600° C., about 300° C. to about 550° C., about 300 to about 500° C., or about 350° C. to about 450° C. In particular embodiments, a catalyst composition can be provided to provide a $NO_x$ conversion of at least about 70% at 200° C. (e.g., wherein the catalyst composition has a ZSA of greater than about 120 $m^2/g$ or total ZSA of greater than about 1300 $m^2$ for an ~1.3 $in^3$ core, in calcined fresh and/or aged form).

The present invention also provides an emission treatment system that incorporates the SCR composition or article described herein. The SCR composition of the present invention is typically used in an integrated emissions treatment system comprising one or more additional components for the treatment of diesel exhaust gas emissions. As such, the terms "exhaust stream", "engine exhaust stream", "exhaust gas stream" and the like refer to the engine effluent as well as to the effluent upstream or downstream of one or more other catalyst system components as described herein. Such additional catalytic components include but are not limited to diesel oxidation catalysts (DOCs), catalyzed soot filters (CSFs), lean $NO_x$ traps (LNTs) and $NH_3$ control catalysts.

Figure 3:
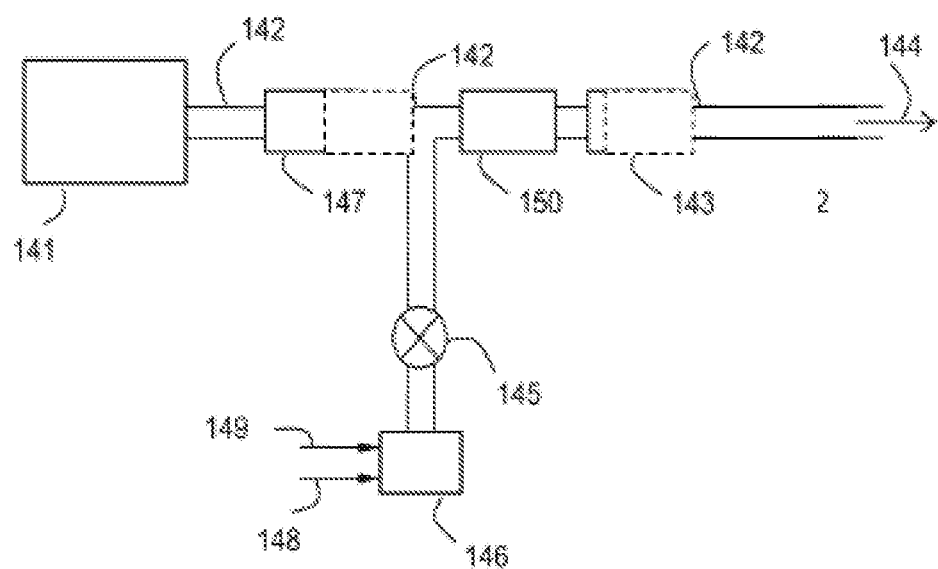
FIG. 3 is an exemplary exhaust gas treatment system including the coated wall flow filter substrate disclosed herein.

FIG. 3 illustrates one exemplary embodiment of an engine system comprising an emission treatment system, a urea injector, and other engine components. SCRoF catalyst 150 as disclosed herein can be disposed directly downstream of the engine or can be downstream from another catalyst component, shown here as optional component 147. An optional additional catalyst 143 can be disposed downstream of the SCRoF catalyst 150, and may contain an AMOx catalyst, another SCR catalyst, and/or a catalyst to oxidize hydrocarbons and carbon monoxide. Depending on the desired level of ammonia, carbon monoxide and hydrocarbon removal, additional oxidation catalysts can be included. The exhaust containing gaseous pollutants (including unburned hydrocarbons, carbon monoxide and $NO_x$) and particulate matter is conveyed from the engine 141 through a connector 142 to the various components shown in FIG. 3 and the exhaust gas exits the system via the tailpipe 144. It is understood that other components, in addition to those shown in FIG. 3 can be included, upstream or downstream of SCRoF 150.

The system shown in FIG. 3 further shows injection of a reductant, for example urea, which may be injected as a spray via a nozzle (not shown) into the exhaust stream. Aqueous urea shown on one line 148 may serve as the ammonia precursor which can be mixed with air on another line 149 in a mixing station 146. Valve 145 can be used to meter precise amounts of aqueous urea which are converted in the exhaust stream to ammonia. The exhaust stream with the added ammonia is conveyed to the SCRoF catalyst 150 for the SCR reaction. The injector shown is an example of one type of system that can be used, and other variants are within the scope of the disclosure.

EXPERIMENTAL

Aspects of the present invention are more fully illustrated by the following example, which are set forth to illustrate certain aspects of the present invention and are not to be construed as limiting thereof.

Example

Different coating methods and different alumina materials were investigated to form SCRoF catalytic articles. Specifically, alumina materials evaluated in this study were dispersible Boehmite alumina, gamma-alumina and silica doped gamma-alumina. Table 1, below, provides the evaluated sample designs and coatings.

SCRoF samples were prepared by washcoating a catalyst slurry onto a wall-flow filter substrate. A catalyst slurry comprised of either one or two components, such that the zeolite and alumina were coated on the filter sequentially or as a mixture. Cu-CHA is typically milled to $D_{90}<5$ μm (90% particles less than 5 μm), and the alumina component is milled to either $D_{90}<3$ (for pre-coat) or 5 μm (in a mixture with zeolite). Sample 70-1 is a Cu-CHA single-component composition (without alumina) and was used as a reference. Samples 70-4 and 70-5 were prepared by coating alumina first and Cu-CHA second. For Sample 70-6, the Cu-CHA-containing washcoat also includes a small amount of alumina-based material. Samples 70-7 to 70-10 were made by coating the mixture of Cu-CHA and alumina. The zeolite-containing washcoat (main coat in Table 1) was coated on a filter substrate twice using the same slurry to obtain the target washcoat loading, first from inlet and then from the outlet with calcination (450° C./1 h) in between.

The substrate used for this example is a SiC wall-flow filter segment (34 mm×34 mm×153 mm) with 63% porosity, 23 μm mean pore size, a cell density of 300 cells/in² and a wall thickness of 0.3 mm. Table 1 describes the washcoat compositions and the design of Sample 70-1 and Samples 70-4 to 70-10. $\gamma$-$Al_2O_3$ (A), $\gamma$-$Al_2O_3$(B) and $\gamma$-$Al_2O_3$(C) in Table 1 represent alumina materials obtained from different suppliers.

TABLE 1

Summary of SCRoF designs: Effect of $Al_2O_3$

| | Coating design/composition | | Actual washcoat loading ($g/in^3$) | | |
| --- | --- | --- | --- | --- | --- |
| Sample | Pre-coat | Main coats (2-coat: inlet/outlet) | Zeolite | Additive | Total |
| 70-1 | — | 1.5 $g/in^3$ Cu-CHA | 1.49 | 0 | 1.49 |
| 70-4 | 0.30 $g/in^3$ $\gamma$-$Al_2O_3$ (A) (D90 < 3 μm) | 1.5 $g/in^3$ Cu-CHA | 1.46 | 0.29 | 1.75 |
| 70-5 | 0.15 $g/in^3$ $\gamma$-$Al_2O_3$ (A) (D90 < 3 μm) | 1.5 $g/in^3$ Cu-CHA | 1.51 | 0.16 | 1.68 |
| 70-6 | 0.15 $g/in^3$ $\gamma$-$Al_2O_3$ (A) (D90 < 3 μm) | 0.15 $g/in^3$ $SiO_2$ doped $\gamma$-$Al_2O_3$ + 1.5 $g/in^3$ Cu-CHA | 1.43 | 0.3 | 1.73 |
| 70-7 | | 0.15 $g/in^3$ $\gamma$-$Al_2O_3$ (A) + 1.5 $g/in^3$ Cu-CHA | 1.43 | 0.14 | 1.57 |
| 70-8 | | 0.15 $g/in^3$ $\gamma$-$Al_2O_3$ (B) + 1.5 $g/in^3$ Cu-CHA | 1.43 | 0.14 | 1.57 |
| 70-9 | | 0.15 $g/in^3$ $\gamma$-$Al_2O_3$ (C) + 1.5 $g/in^3$ Cu-CHA | 1.43 | 0.14 | 1.57 |
| 70-10 | | 0.15 $g/in^3$ $SiO_2$ doped $\gamma$-$Al_2O_3$ + 1.5 $g/in^3$ Cu-CHA | 1.43 | 0.14 | 1.57 |

Figure 4:
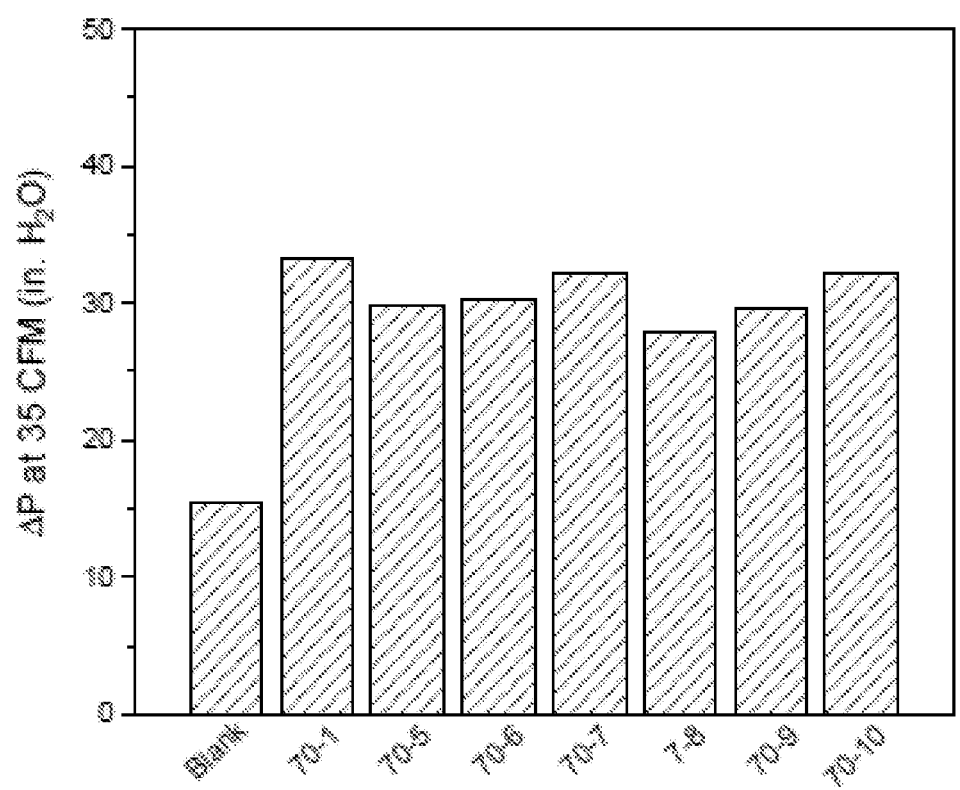
FIG. 4 is a graph of cold flow ΔP measurements over SCRoF samples of the Example provided herein, at a flow rate of 35 ft$^3$/min.

FIG. 4 provides cold-flow ΔP measurements of the samples in Table 1 at a flow rate of 35 ft³/min. As shown in the graph, the ΔP for most of the coated samples was comparable.

Figure 5:
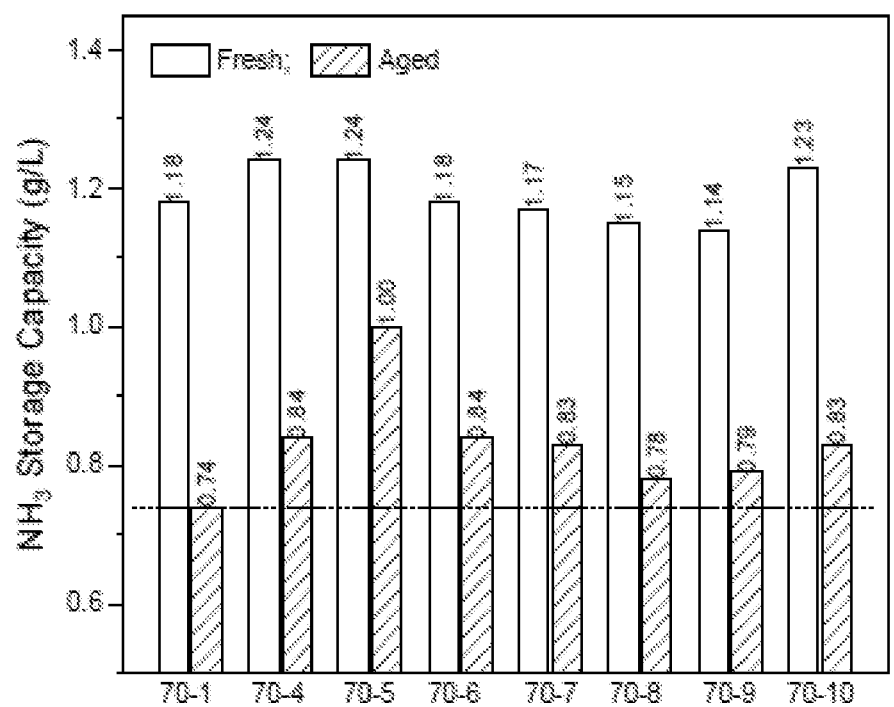
FIG. 5 is a plot of $NH_3$ storage capacity measurements over fresh and aged SCRoF samples of the Example.

The samples were evaluated for $NH_3$ storage capacity in fresh form, and then subjected to aging (850° C. for 5 h with 10% steam]) and again evaluated for $NH_3$ storage capacity. $NH_3$ storage capacity was measured through an $NH_3$ adsorption-desorption experiment. $NH_3$ adsorption was performed at 200° C. with an SCR feed, which consists of 500 ppm NO, 500 ppm $NH_3$, 10% $O_2$, 5% $CO_2$, 5% $H_2O$ and balance $N_2$ at GHSV=60,000 h⁻¹. The $NH_3$ desorption experiment consisted of two parts: isothermal purging at 200° C. (1 hour) with an inert gas steam (5% $CO_2$, 5% $H_2O$ and balance $N_2$) and temperature-programmed desorption (TPD) up to 550° C. in the same stream. The cumulative $NH_3$ desorption was used as the $NH_3$ storage capacity. The $NH_3$ storage capacities of all fresh and aged samples are summarized in FIG. 5. In Table 2, the $NH_3$ storage capacity is further broken down to the isothermal desorption (weakly bound $NH_3$) and the TPD (strongly held $NH_3$) parts as well as the difference between fresh and aged samples.

The data indicate that on fresh samples, the total amount of $NH_3$ desorption from the reference sample was 1.18 g/L, and all other samples were within +/−10% from the reference, with Samples 4, 5, and 10 slightly higher (1.22-1.24 g/L). On the aged samples, the total amount of $NH_3$ desorbed is significantly lower than that of the corresponding fresh samples, Interestingly, the $NH_3$ desorbed in the isothermal part is higher on an aged sample than on the corresponding fresh sample. Although not intending to be limited by theory, it is believed that the amount of weaker acid sites increased after aging but that of stronger acid sites decreased.

Figure 6:
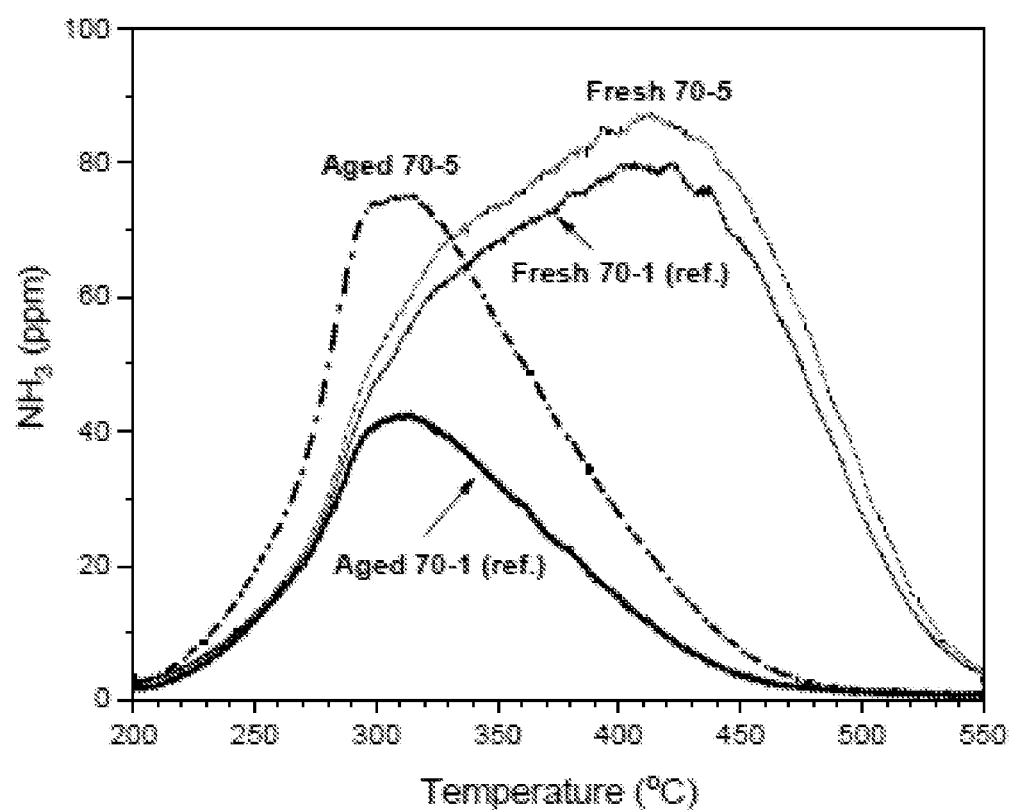
FIG. 6 is a graph of temperature-programmed $NH_3$ desorption profiles of certain samples of the Example.

Among aged samples, Sample 70-5 showed the highest total $NH_3$ capacity (1.0 g/L), which was much higher than the zeolite-only reference (0.74 g/L). Sample 70-5 also shows the least decrease in $NH_3$ capacity after 850° C./5 h aging. FIG. 6 specifically compares the $NH_3$ TPD profiles for Samples 70-1 (control/reference) and 70-5. Similar $NH_3$ desorption profiles are found on the fresh samples. On the aged samples, however, the $NH_3$ desorption intensity on Sample 70-5 is significantly higher than that of Sample 70-1.

TABLE 2

Quantification of $NH_3$ desorption (g/L)

| | Fresh | | | Aged | | | ΔTotal |
| --- | --- | --- | --- | --- | --- | --- | --- |
| Sample | Isothermal | TPD | Total | Isothermal | TPD | Total | $NH_3$ cap. = Fresh − Aged |
| 70-1 | 0.45 | 0.73 | 1.18 | 0.51 | 0.23 | 0.74 | 0.44 |
| 70-4 | 0.39 | 0.85 | 1.24 | 0.51 | 0.33 | 0.84 | 0.40 |
| 70-5 | 0.43 | 0.81 | 1.24 | 0.58 | 0.42 | 1.00 | 0.24 |
| 70-6 | 0.42 | 0.76 | 1.18 | 0.52 | 0.32 | 0.84 | 0.347 |
| 70-7 | 0.43 | 0.75 | 1.18 | 0.51 | 0.32 | 0.83 | 0.35 |
| 70-8 | 0.43 | 0.72 | 1.15 | 0.50 | 0.28 | 0.78 | 0.37 |
| 70-9 | 0.43 | 0.71 | 1.14 | 0.51 | 0.28 | 0.79 | 0.35 |
| 70-10 | 0.44 | 0.79 | 1.23 | 0.52 | 0.31 | 0.83 | 0.40 |

Figure 7:
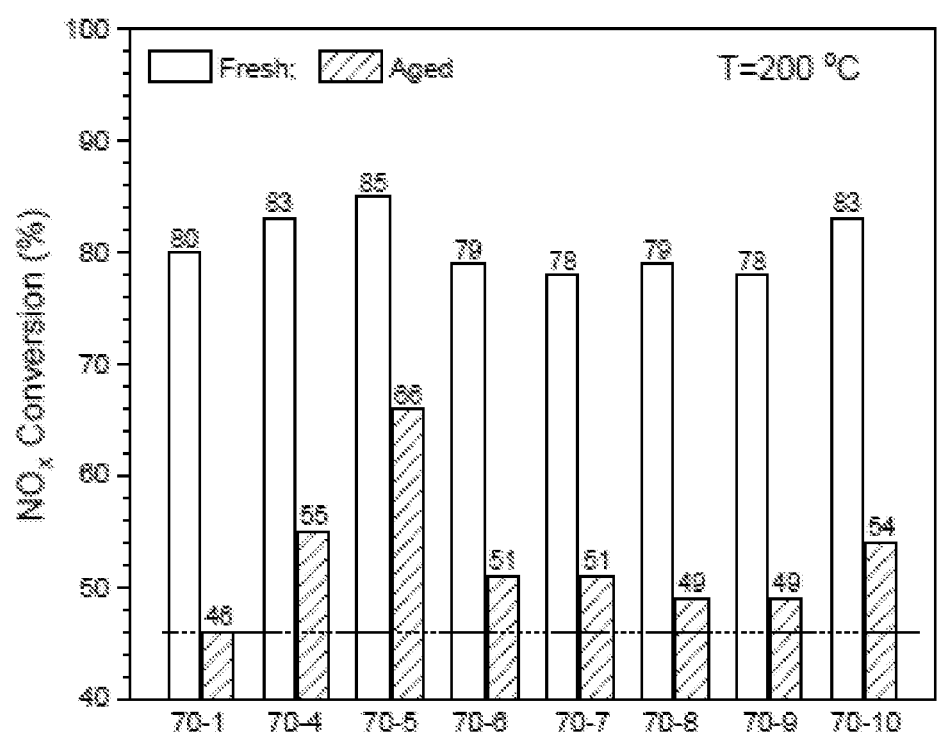
FIG. 7 is a bar graph of $NO_x$ conversion at 200° C. over fresh and aged SCRoF samples of the Example.

The $NO_x$ conversions over fresh and aged SCRoF samples were measured from 200 to 600° C. under steady-state reaction conditions. The reaction was carried out with a feed consisting of 500 ppm $NH_3$, 500 ppm NO, 10% $O_2$, 5% $H_2O$, 5% $CO_2$ in $N_2$ at GHSV=60,000 h⁻¹. For clarity, the $NO_x$ conversions at 200° C. and 600° C. are plotted as bar graphs (FIGS. 7 and 9).

At 200° C., all fresh samples have similar $NO_x$ conversion (around 80%). However, all aged samples show higher $NO_x$ conversions at 200° C. than the reference (Sample 70-1), among them Samples 70-5, 70-4, and 70-10 are significantly higher (by 20%, 9%, and 8%, respectively). Sample 70-5 is the most active catalyst at 200° C.

Figure 8:
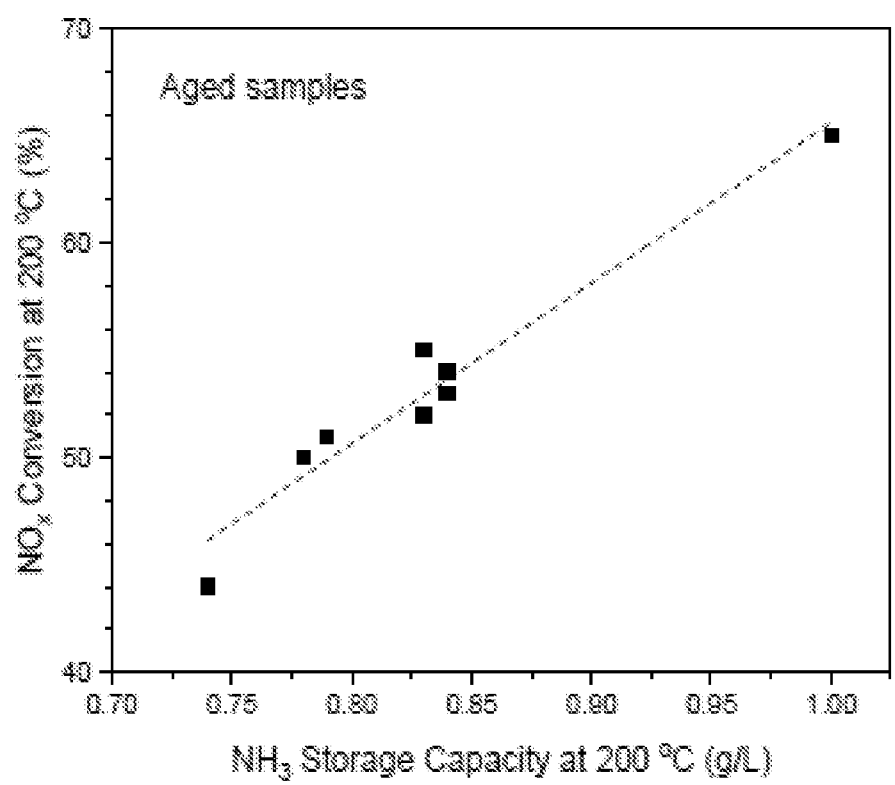
FIG. 8 is a plot of comparing $NO_x$ conversion at 200° C. and cumulative $NH_3$ desorption over aged samples.

FIG. 8 shows the correlations between the steady-state $NO_x$ conversion at 200° C. and the cumulative $NH_3$ desorption at 200° C. over the aged SCRoF samples. As shown, the $NO_x$ conversion is linearly correlated with $NH_3$ capacity. Large differences in activity and $NH_3$ capacity were observed on aged catalysts. Although not intending to be limited by theory, it is believed that the fundamental reason behind this correlation is that the $NH_3$ storage capacity is a measure of the number of active sites (exchanged copper sites) on 850° C. aged catalysts. What is striking is the fact that large differences were found, in terms of $NO_x$ conversion and $NH_3$ adsorption capacity, over the aged samples (which have the same amount of Cu-CHA). Again, not intending to be limited by theory, this suggests that, as a result of the inclusion of alumina, different amounts of active copper sites remain in the zeolite after the 850° C. aging.

Figure 9:
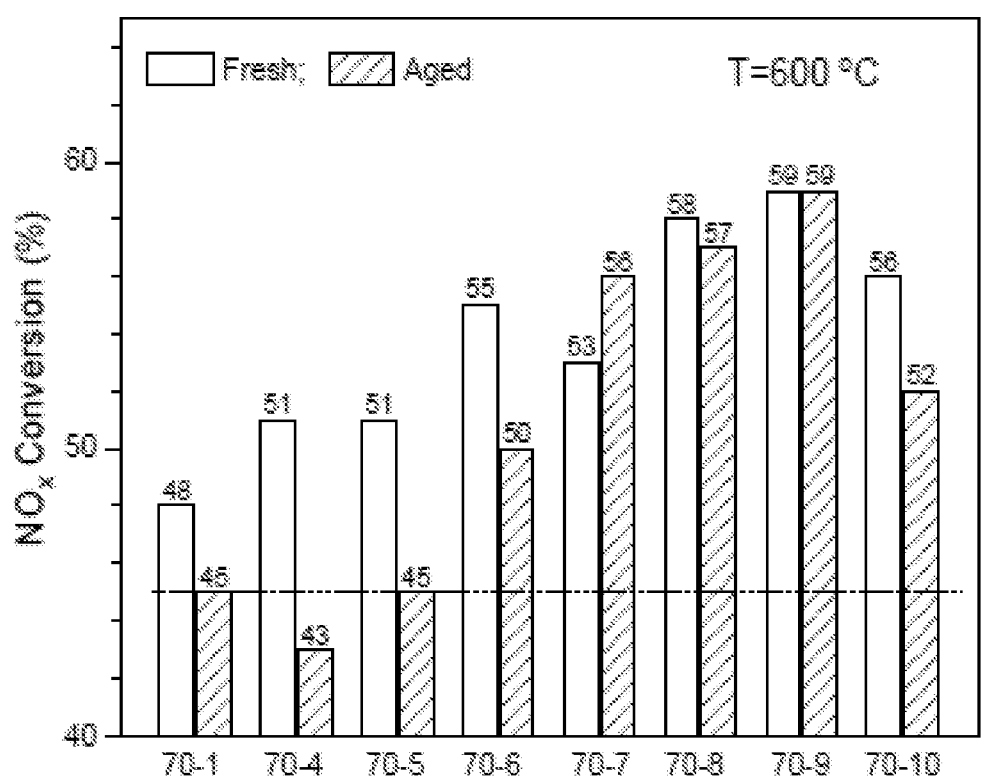
FIG. 9 provides bar graph of $NO_x$ conversion at 600° C. over fresh and aged SCRoF samples of the Example.

As shown in FIG. 9, at 600° C., the fresh $NO_x$ conversions on all the alumina-added samples are higher than the reference, some by greater than 10%. This is a surprising observation because the alumina additive was not expected to take effect without any high temperature treatment. After the 850° C. aging, the activity difference becomes more striking. It appears that pre-coating the filter with alumina does not significantly the $NO_x$ conversion at 600° C., but mixing alumina with the zeolite definitely increases the high-temperature $NO_x$ conversion. The $NO_x$ conversion increase by mixing alumina with zeolite ranges from 7 to 14%, with Sample 70-9 being the best. Samples 5, 6, and 7, all containing γ-$Al_2O_3$(A) additive, can illustrate the different effects due to coating methodology.

Figure 10:
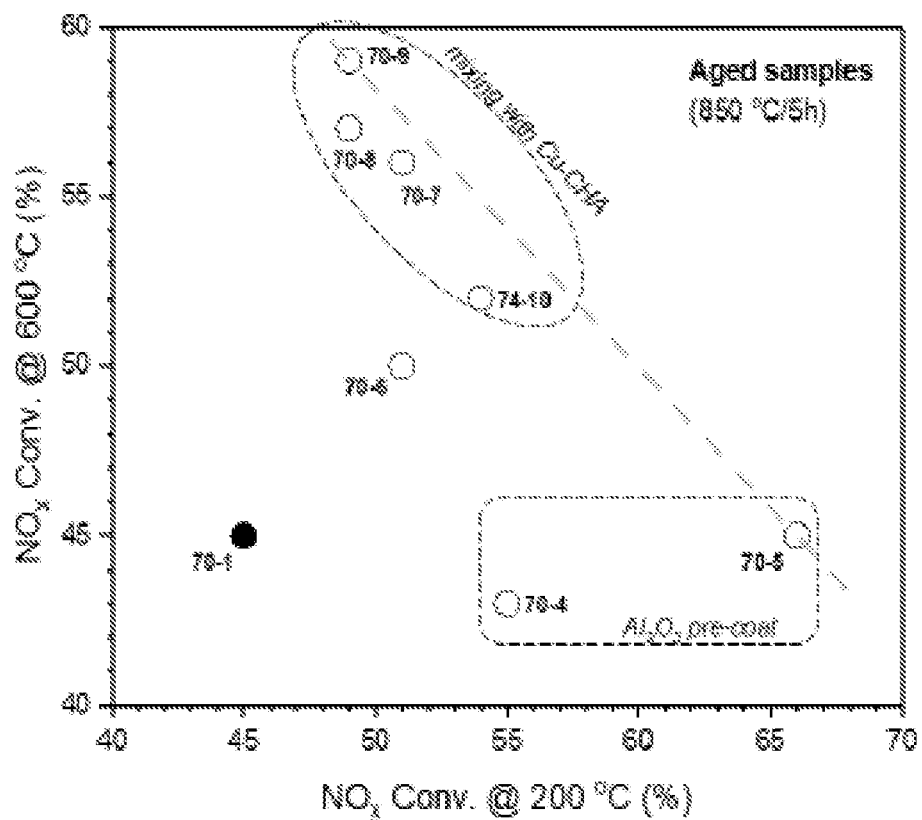
FIG. 10 is a plot comparing high and low temperature activity of aged SCRoF samples of the Example.

In conclusion, this Example found that, for aged samples, mixing alumina with zeolite resulted in slightly higher $NO_x$ conversion at 200° C. (Samples 70-7 to 70-10). Pre-coating 0.15 g/in³ γ-$Al_2O_3$(A) significantly increased $NO_x$ conversion (Sample 70-5). For aged samples, mixing alumina with zeolite resulted in significantly higher $NO_x$ conversion at 600° C. (Samples 70-6 to 70-10). These findings are summarized in FIG. 10.

$N_2O$ is a byproduct of the SCR process, which typically appears as a low-temperature peak and as a high-temperature peak. The low-temperature peak typically appears between 200 and 250° C. for fresh samples and 200 to 300° C. for aged samples. The high-temperature peak appears between 450 and 550° C. for fresh samples and between 500 and 600° C. for aged samples. Table 3 shows the peak $N_2O$ formation for the fresh and aged samples. For both fresh and aged catalysts, the alumina-containing catalysts show lower peak $N_2O$ formation at high temperatures relative to the zeolite-only reference. For some fresh catalysts, the low-temperature peak $N_2O$ formation is also lower than the reference.

TABLE 3

| | Peak N$_2$O formation (ppm) | | | |
| --- | --- | --- | --- | --- |
| | Fresh Catalyst | | Aged Catalyst | |
| Catalyst | Low Temperature | High temperature | Low Temperature | High temperature |
| 70-1 | 12 | 8 | 7 | 18 |
| 70-4 | 12 | 6 | 8 | 15 |
| 70-5 | 12 | 7 | 9 | 16 |
| 70-6 | 10 | 6 | 8 | 15 |
| 70-7 | 11 | 7 | 8 | 15 |
| 70-8 | 10 | 6 | 7 | 15 |
| 70-9 | 10 | 6 | 7 | 15 |

While the invention herein disclosed has been described by means of specific embodiments and applications thereof, numerous modifications and variations could be made thereto by those skilled in the art without departing from the scope of the invention set forth in the claims. Furthermore, various aspects of the invention may be used in other applications than those for which they were specifically described herein.

What is claimed is:

1. A catalyst article comprising:
a wall-flow filter substrate; and
a catalyst composition coated on the wall-flow filter substrate,
wherein the catalyst composition comprises:
a zeolite with sufficient copper (Cu) exchanged into cation sites of the zeolite such that the zeolite has a Cu/Al ratio ranging from 0.1 to 0.5 and a CuO loading ranging from 1 wt. % to 15 wt. % based on a total weight of the zeolite; and
a copper trapping component in an amount ranging from about 1 wt. % to about 20 wt. % based on the weight of the Cu-exchanged zeolite; and
wherein the copper trapping component comprises a plurality of particles having a D90 particle size ranging from about microns 0.5 to about 20 microns, and the copper trapping component comprises non-dispersible alumina having an agglomerate size of $D_{10}$>0.1 microns and is substantially free of any active metal associated therewith.

2. The catalyst article of claim 1, wherein the catalyst composition is in a form of a first washcoat comprising the zeolite and a second washcoat comprising the copper trapping component, and
wherein the second washcoat is disposed directly on at least a portion of the wall-flow filter substrate and the first washcoat is disposed directly on at least a portion of the second washcoat.

3. The catalyst article of claim 2, wherein the first washcoat further comprises a second copper trapping component, and wherein the second copper trapping component is the same as or different than the copper trapping component in the second washcoat.

4. The catalyst article of claim 2, wherein a first portion of the second washcoat is located within walls of the substrate and a second portion of the second washcoat is located on the walls of the substrate.

5. The catalyst article of claim 4, wherein a portion of the first washcoat is located on the walls of the substrate.

6. The catalyst article of claim 2, wherein a portion of the second washcoat is further located within walls of the substrate.

7. The catalyst article of claim 1, wherein the catalyst composition is in a form of a washcoat comprising a physical blend of the zeolite and the copper trapping component, and wherein the washcoat is disposed directly on at least a portion of the wall-flow filter substrate.

8. The catalyst article of claim 1, wherein the catalyst article exhibits enhanced NOx conversion at 200° C. as compared with a catalyst article that does not comprise the copper trapping component.

9. The catalyst article of claim 1, wherein the catalyst article exhibits enhanced NOx conversion at 600° C. as compared with a catalyst article that does not comprise the copper trapping component.

10. The catalyst article of claim 1, wherein the copper trapping component comprises a material chosen from alumina, silica, zirconia, niobia, molybdenia, and combinations thereof.

11. The catalyst article of claim 10, wherein the copper trapping component comprises alumina.

12. The catalyst article of claim 11, wherein the alumina is chosen from boehmite, gamma-alumina, silica-alumina, stabilized alumina, and combinations thereof.

13. The catalyst article of claim 1, wherein the copper trapping component comprises a plurality of particles having a D90 particle size ranging from about 0.5 microns to about 5 microns.

14. The catalyst article of claim 1, wherein the copper trapping component comprises a plurality of particles having a D90 particle size ranging from about 0.5 microns to 3 microns.

15. The catalyst article of claim 1, wherein the zeolite is in the form of particles having an average particle size ranging from about 0.01 microns to about 5 microns.

16. The catalyst article of claim 1, wherein the zeolite has an "8-ring" framework structure chosen from the group consisting of AEI, AFT, AFV, AFX, AVL, CHA, DDR, EAB, EEI, ERI, IFY, IRN, KFI, LEV, LTA, LTN, MER, MWF, NPT, PAU, RHO, RTE, RTH, SAS, SAT, SAV, SFW, TSC, UFI, and combinations and intergrowths thereof.

17. The catalyst article of claim 1, wherein the zeolite has a "10-ring" framework chosen from AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and combinations and intergrowths thereof.

18. The catalyst article of claim 1, wherein the zeolite has a "12-ring" framework structure chosen from AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET and combinations and intergrowths thereof.

19. The catalyst article of claim 1, wherein the zeolite has a framework structure comprising an intergrowth of CHA and GME or AEI and GME.

20. The catalyst article of claim 1, wherein the copper trapping component is present in an amount ranging from about 2 wt. % to about 20 wt. % based on the weight of the Cu-exchanged zeolite.

21. The catalyst article of claim 1, wherein the zeolite is present in an amount to obtain loading on the substrate in an amount ranging from about 0.5 g/in$^3$ to about 5.0 g/in$^3$.

22. An exhaust gas treatment system, comprising the catalyst article of claim 1 downstream of a urea injector and in fluid communication with an internal combustion engine.

23. The exhaust gas treatment system of claim 22, further comprising a component chosen from the group consisting of a diesel oxidation catalyst, a soot filter, an ammonia oxidation catalyst, a lean $NO_x$ trap, and any combination thereof.

* * * * *